United States Patent [19]

Jamieson et al.

[11] Patent Number: 4,581,697

[45] Date of Patent: Apr. 8, 1986

[54] CONTROLLER FOR COMBUSTIBLE FUEL BURNER

[75] Inventors: J. Scott Jamieson; Henry A. Gleason, III, both of Goshen, Ind.

[73] Assignee: Johnson Service Company, Milwaukee, Wis.

[21] Appl. No.: 538,092

[22] Filed: Oct. 3, 1983

[51] Int. Cl.$^4$ .................. G05B 11/01; G06F 7/76; F23Q 23/00; F23Q 9/08

[52] U.S. Cl. .................. 364/140; 364/148; 364/431.04; 364/143; 431/25; 431/26; 431/46; 431/51

[58] Field of Search ............... 364/140, 141, 143, 144, 364/431.04, 431.05, 148; 431/24, 25, 26, 46, 51, 45, 76, 78

[56] References Cited

U.S. PATENT DOCUMENTS

| | | | |
|---|---|---|---|
| 3,996,452 | 12/1976 | Schulze et al. | 364/148 |
| 4,077,762 | 3/1978 | Matthews | 431/45 |
| 4,178,149 | 12/1979 | Matthews | 431/51 X |
| 4,209,833 | 6/1980 | Krupp et al. | 364/431.04 X |
| 4,242,079 | 12/1980 | Mathews | 431/51 X |
| 4,375,951 | 3/1983 | Bohan, Jr. | 431/25 X |
| 4,384,845 | 5/1983 | Hinton et al. | 431/26 |
| 4,419,761 | 12/1983 | Kuze | 364/143 X |
| 4,457,101 | 7/1984 | Gaiffier | 431/46 |
| 4,498,036 | 2/1985 | Salemka | 364/148 X |
| 4,507,723 | 3/1985 | Brackman, Jr. | 364/148 X |

Primary Examiner—Charles E. Atkinson
Assistant Examiner—Jon D. Grossman
Attorney, Agent, or Firm—L. L. Shupe; J. J. Jochman, Jr.; J. P. Ryan

[57] ABSTRACT

A microprocessor-based burner control apparatus includes an input stage adapted for controllably generating an input signal which is repetitively transitional between a first logic state and a second logic state. A synchronously controlled output stage includes a capacitor, a rectified source of alternating voltage and a microprocessor-switched transistor for controllably charging the capacitor during a half cycle of the alternating voltage having a first polarity. The capacitor is discharged during half cycles of the alternating voltage having a second polarity and the charging and discharging activity thereby actuates a load device. A programmable microprocessor is coupled to the input and output stages and is adapted to receive a synchronizing signal whereby the charging and discharging activity occurs in a predetermined relationship to the synchronizing signal. A method for controlling the operation of a combustible fuel burner is also disclosed.

1 Claim, 4 Drawing Figures

CONTROLLER FOR COMBUSTIBLE FUEL BURNER

FIELD OF THE INVENTION

This invention relates generally to the art of gas ignition controls and more particularly, to microprocessor based controls intended for use upon space heating furnaces of the combustible gas fuel type.

BACKGROUND OF THE INVENTION

A variety of gas ignition controls are known and generally include apparatus constructed of discrete components for effecting a single, predetermined control sequence tailored to a specific application. Such gas ignition systems typically include a relay which is energized in response to a thermostatic demand for heat and for actuating a pilot gas valve, a spark generating circuit for igniting the pilot gas either coincidently with the energization of the pilot valve or within a predetermined time thereafter, a flame sensing probe for detecting the presence of a pilot flame and an output relay section for energizing a main fuel valve upon the detection of the pilot flame. Refinements of this fundamental system may include a pair of electromagnetic relays which are required to be operated in a particular sequence upon each reception of a thermostatic demand for heat. The sequential operation of these relays is effective for verifying the integrity of certain circuit components. Examples of such gas ignition systems are shown and described in U.S. Pat. Nos. 4,077,762 and 4,178,149. While these gas ignition systems have heretofore been satisfactory, they have failed to appreciate the manner in which a microprocessor may be utilized therein to continually monitor and verify the integrity of certain circuit components and to provide a degree of application flexibility heretofore unknown.

In particular, these earlier devices have failed to appreciate how a microprocessor-based control apparatus may be programmably configured with any one of a variety of control strategies whereby the apparatus may be readily adapted to a variety of gas fueled furnaces, each presenting a different control requirement.

A microprocessor-based apparatus for controlling the operation of a combustion fuel burner and which makes advantageous use of a synchronizing signal for monitoring the integrity of certain circuit components, which may incorporate one or more input and output stages and which is adaptable to conduct its control sequences in accordance with predetermined lapses of time rather than upon the occurrence of predetermined events would be a distinct advance in the art.

SUMMARY OF THE INVENTION

In general, a microprocessor-based burner control apparatus includes an input stage adapted for controllably generating an input signal which is repetitively transitional between a first logic state and a second logic state. A synchronously controlled output stage includes a capacitor, a rectified source of alternating voltage and a microprocessor-switched transistor for controllably charging the capacitor during a half cycle of the alternating voltage having a first polarity. The capacitor is discharged during half cycles of the alternating voltage having a second polarity and the charging and discharging activity thereby actuates a load device. A programmable microprocessor is coupled to the input and output stages and is adapted to receive a synchronizing signal whereby the charging and discharging activity occurs in a predetermined relationship to the synchronizing signal.

A method for controlling the operation of a combustible fuel burner includes the steps of providing a system clocking signal as an input to a microprocessor and providing an output stage which includes a rectified source of alternating voltage, a capacitor and a transistor. The transistor is switchable in synchronism with the clocking signal for charging and discharging the capacitor. An input signal is also directed to the microprocessor, the input signal being repetitively transitional between a logic "1" voltage and a logic "0" voltage state, the timing of such logic voltage transitions having a predetermined relationship to the clocking signal. The transistor is switched to a conducting state in response to the input signal for discharging the capacitor to actuate a fuel valve. The transistor conducting state is permitted to occur only during a logic "0" voltage state of the input signal.

It is an object of the present invention to provide a microprocessor-based burner control apparatus which may be readily adapted to a wide variety of control strategies.

Another object of the present invention is to provide a microprocessor-based controller which utilizes a synchronizing signal for monitoring the integrity of certain circuit components.

Yet another object of the present invention is to provide a burner controller wherein an input signal may be repetitively transitional in a predetermined relationship to a clocking signal.

Still another object of the present invention is to provide a controller wherein an output stage is constructed and arranged to disable a load device connected thereto in event of a failure of an output stage transistor.

Another object of the present invention is to provide a microprocessor-based fuel burner controller wherein control strategies effected thereby are in accordance with predetermined lapses of time. How these and other objects are accomplished will become apparent from the detailed description thereof taken with the accompanying drawing.

DESCRIPTION OF THE PREFERRED EMBODIMENTS

Figure 1:
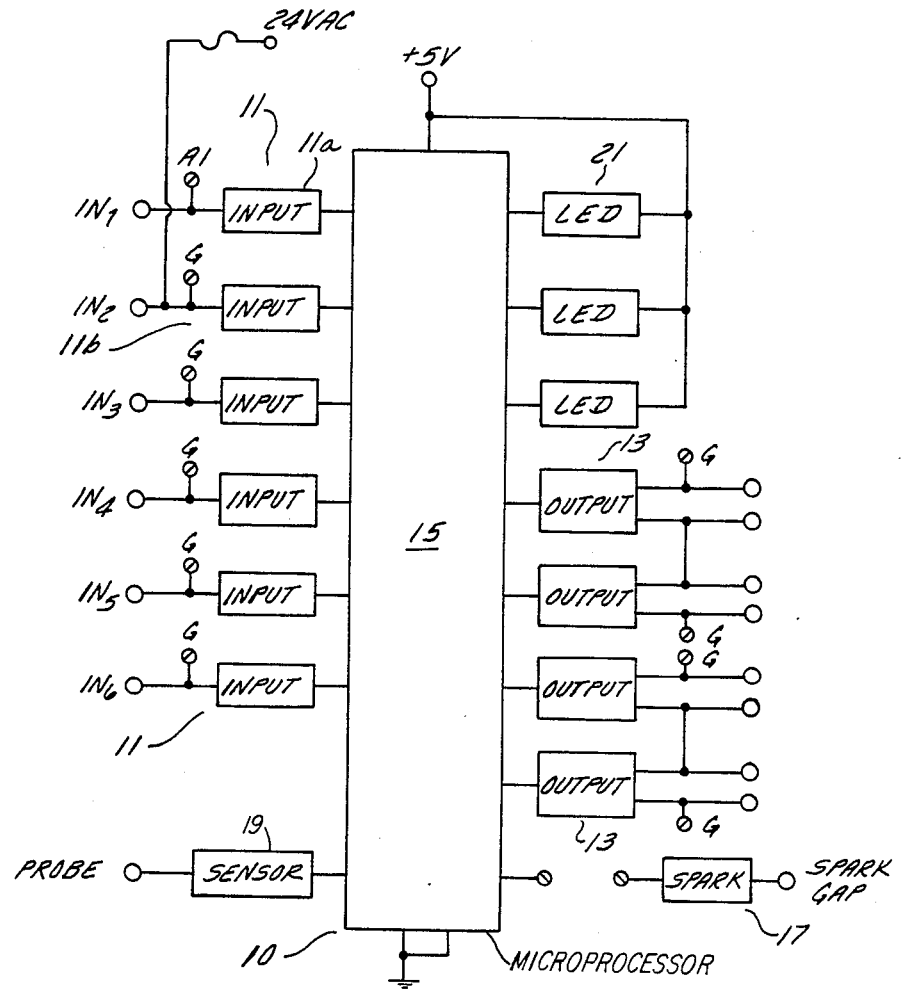
FIG. 1 is a simplified, block diagram of the controller of the present invention.

Referring to FIG. 1, the controller 10 is shown to include a plurality of input stages 11, each stage 11 being adapted for controllably generating an input signal repetitively transitional between a first logic state and a second logic state. Each of a plurality of synchronously controlled output stages 13 includes circuitry for actuating a load device (not shown) which may be coupled thereto and examples of such load devices include pilot fuel valves, main fuel valves and blower fans. A programmable microprocessor 15 is coupled to the input and output stages 11, 13 and is adapted to receive a synchronizing or clocking signal whereby actuation of a load device occurs in a predetermined relationship to the synchronizing signal. The microprocessor 13 is adapted to energize a spark generating circuit 17 for igniting a pilot flame and is further adapted to receive a signal from a flame sensing unit 19 which is representative of the presence of the pilot flame. Color coded light emitting diodes 21 (LED) may be optionally employed to aid controller troubleshooting. It is to be appreciated that, in its simplest form, the controller 10 includes a pair of input stages 11, a first stage 11a for generating an input signal in response to a thermostatic demand for heat and a second input stage 11b for generating the microprocessor synchronizing or clocking signal. Further, this simplest configuration includes a single output stages 13 for controllably actuating a main fuel valve which may be coupled thereto in a pilotless system. In its most application-flexible form, the controller 10 is embodied as depicted in FIGS. 1, 2A-2C and will be particularly useful in furnaces of the pulse burning type. This is so since pulse burning furnaces require air and fuel to be mixed in a relatively precise ratio and several ignition trials and subsequent purges of the unignited fuel-air mixture may be required before continuous ignition is achieved. Additionally, the control strategies used with such furnaces are frequently required to be cognizant of other system parameters as, for example, the presence or absence of a moving stream of air in the furnace plenum, the presence or absence of a pilot fuel valve, the presence of a plurality of main fuel valves and the temperature of the water in the boiler.

Figure 2A:
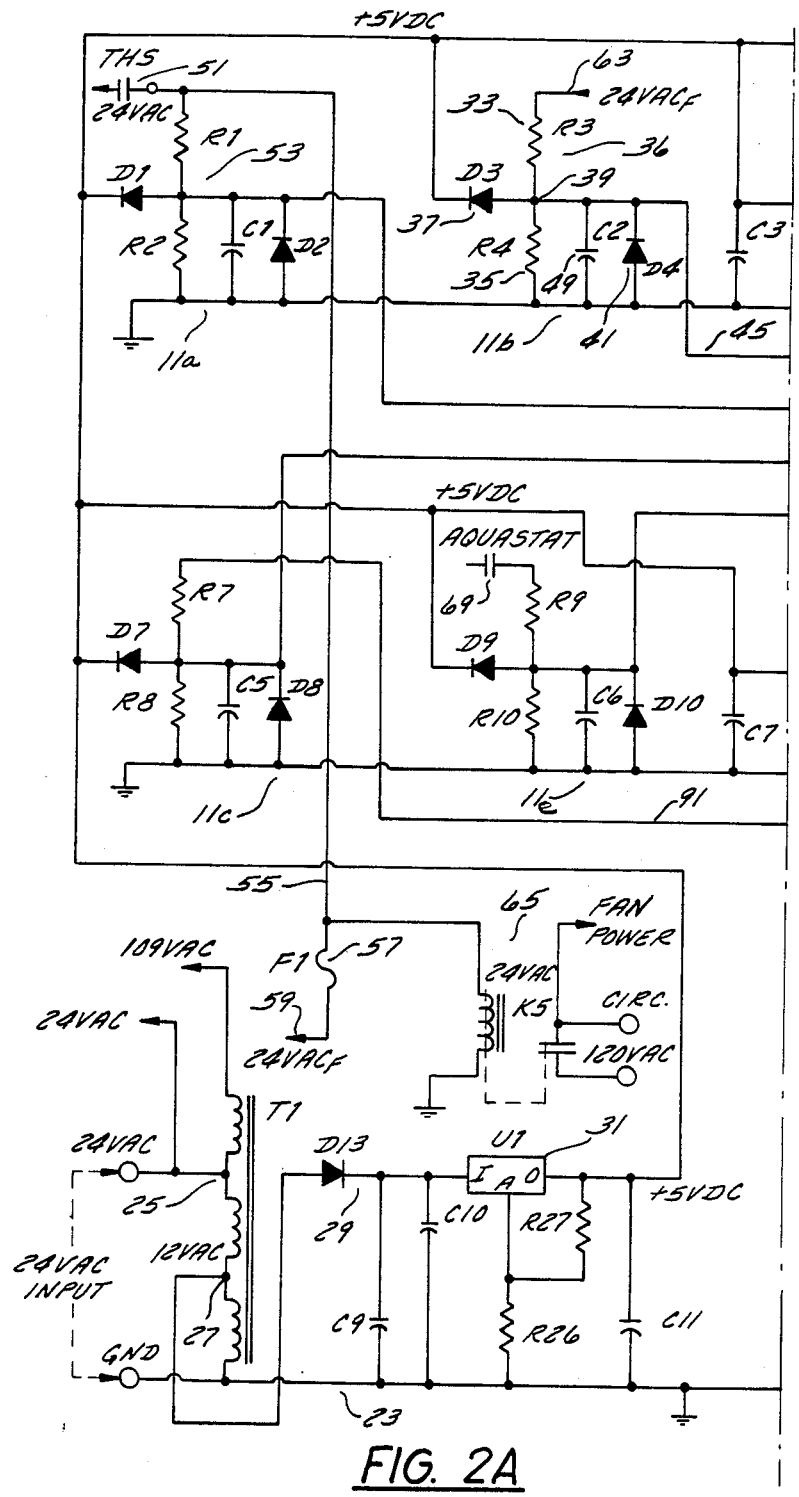
FIGS. 2A, 2B and 2C taken together along the drawing match lines comprise a detailed electrical schematic diagram of the controller of the present invention.
Figure 2B:
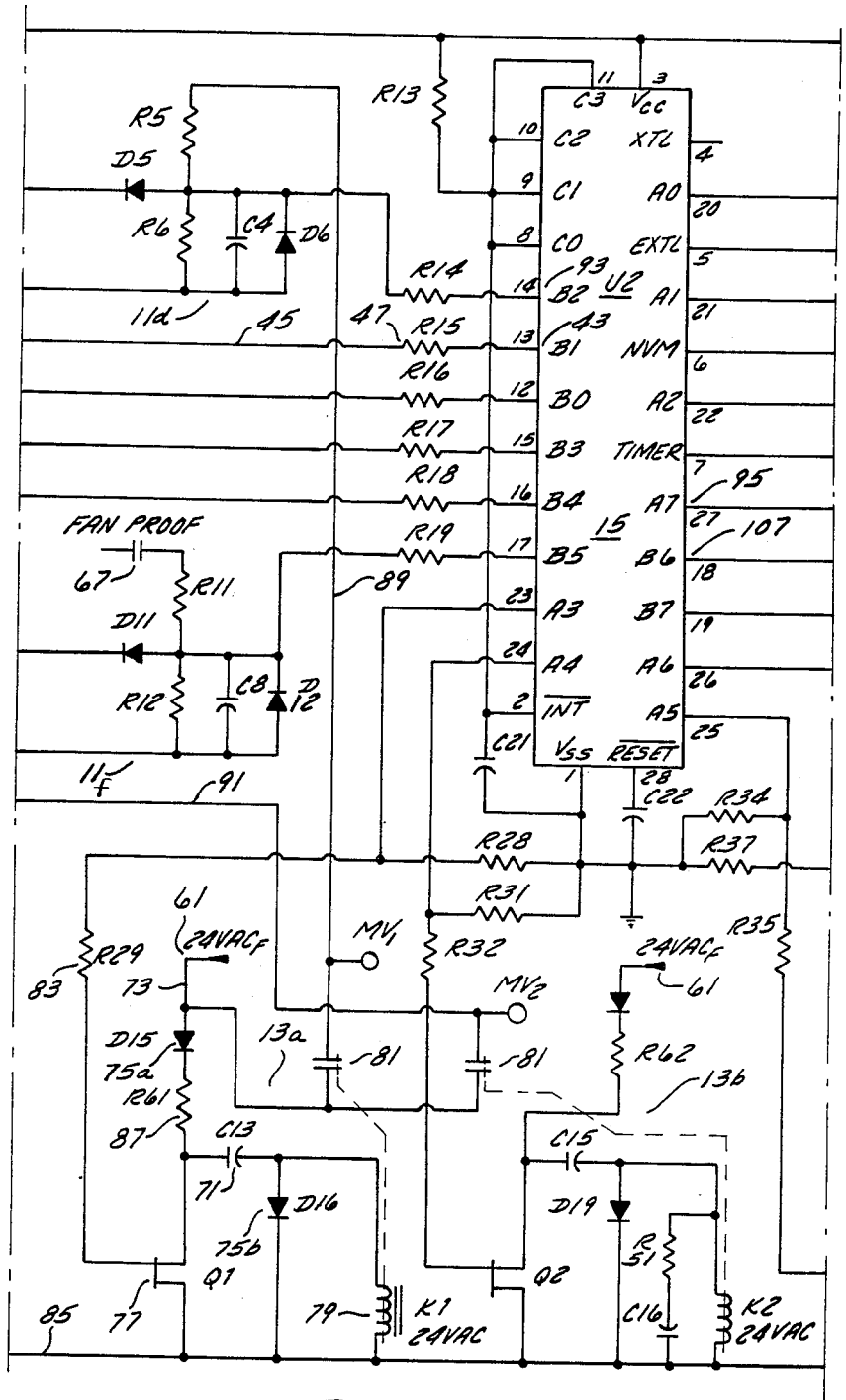
Figure 2C:
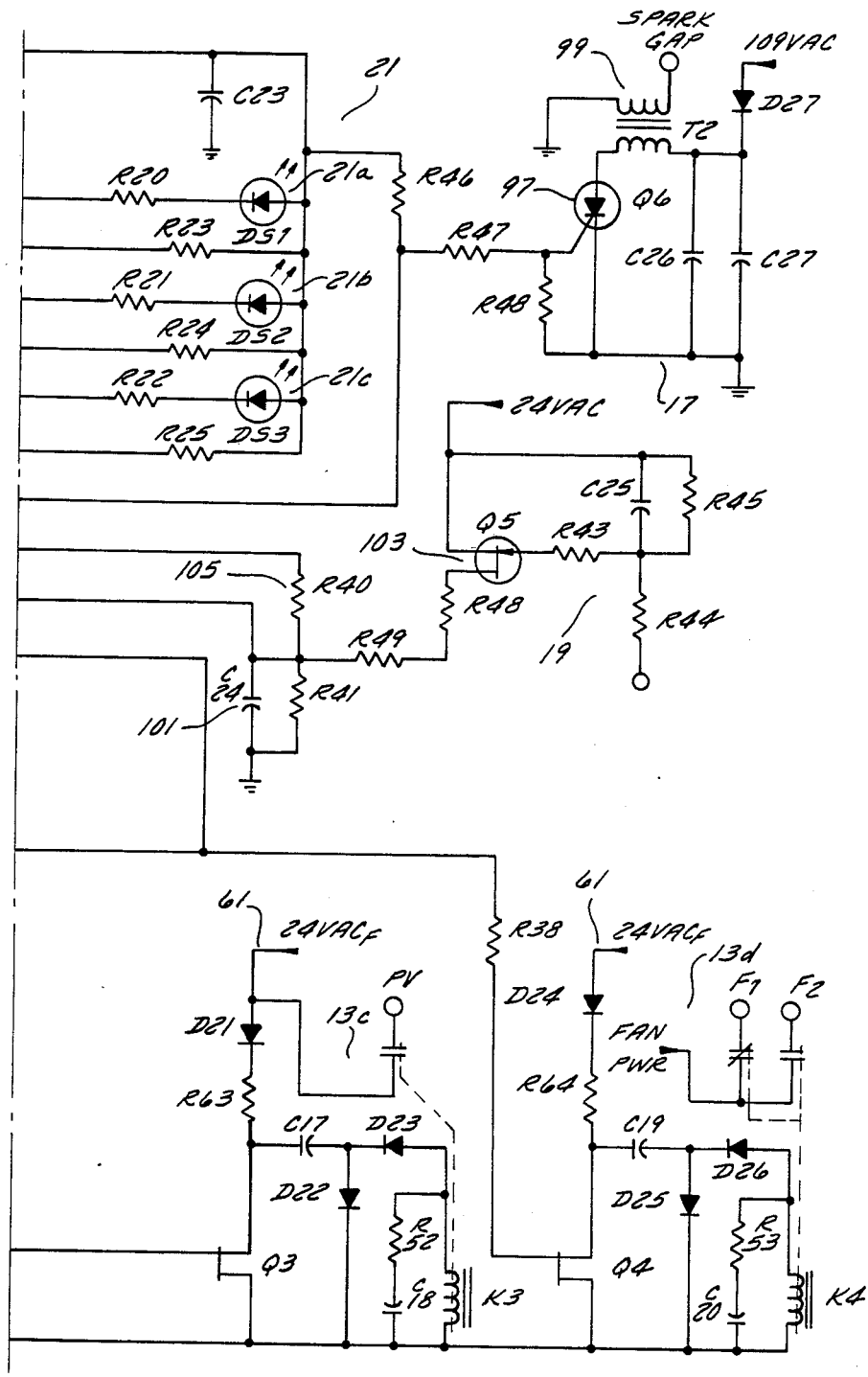

Referring to FIGS. 2A, 2B and 2C, the controller 10 includes a plurality of input stages 11a-f, six in the exemplary embodiment; a plurality of output stages 13a-d inclusive, four in the exemplary embodiment, and a programmable microprocessor 15 coupled to the input stages 11 and the output stages 13 for directing and supervising the operation thereof. A power supply 23 including a regulated section provides the necessary alternating and direct current voltages for controller operation. The microprocessor 15 may be adapted to control the operation of a spark generating circuit 17 which may be an integral part of the controller 10 or a separate component. Similarly, the microprocessor 15 is adapted to receive a signal from a flame sensing unit 19 which, in a pilot-type system, indicates the presence of a pilot flame and which likewise may be integrally or separately provided.

More particularly, the power supply 23 is shown to include a multiwinding, tapped transformer 25 for receiving an input voltage of 24 VAC in the preferred embodiment. A center tap 27 provides a 12 VAC input voltage to a halfwave DC power section 29, and thence to a regulator 31, the output voltage of which is +5 VDC. It should be appreciated that the full input voltage of 24 VAC may be directed to the DC power section 29 but with an attendant increase in wasted, dissipated power at the regulator 31.

In commonly employed microprocessor techniques, a microprocessor will be programmed to interpret the presence of a continuous logic "1" signal as representing a predetermined state or condition and the presence of a continuous logic "0" signal as representing another state or condition. However, it is known that certain types of component failures may result in the continuous application of either type of logic state signal to a microprocessor which the latter will incorrectly interpret. The help guard against this eventuality, the controller 10 of the present invention makes advantageous use of a synchronizing or clocking signal which is utilized for detecting failures of a component within an input stage 11.

Referring again to FIGS. 2A and 2B, the synchronous signal, second input stage 11b is shown to include a pair of serially connected resistors 33 and 35 for defining a voltage divider 36 and a diode 37 for limiting the magnitude of the voltage at the node 39 to a maximum value of about +5.6 VDC during those positive half cycles of alternating voltage applied across the voltage divider. During negative half cycles of the applied AC voltage, the shorting diode 41 limits the voltage at the node to about −0.6 VDC. The node voltage is applied to the synchronizing input port 43 by a synchronizing line 45 serially coupled to a current limiting resistor 47 and a capacitor 49 is included for the suppression of transient electrical noise. From the foregoing, it will be apparent that the synchronizing or clocking logic signals applied to the port 43 will be at a logic "1" state during positive one half cycles of the applied alternating voltage and will be at a logic "0" state during the negative half cycles of that alternating voltage.

Referring next to the first thermostat input stage 11a, a thermostat contact 51 is coupled between the stage voltage divider 53 and a source of AC power such as 24 VAC which may be conveniently taken at the input transformer 25. The thermostat stage 11a includes an output power line 55 having a fuse 57 in series therewith, the load terminal 59 of which may be connected to one or more output stages 13 at the terminals 61 for stage powering. As will be apparent from the description that follows, it will be convenient from a synchronizing standpoint to likewise couple the load terminal 59 to the synchronizing stage input 63 as its source of AC power. In certain applications, it may be desirable to energize a relay 65 for fan control immediately upon closure of the thermostat contacts 51 in response to a demand for heat and, accordingly, such a relay 65 may be electrically coupled directly to the thermostat output power line 55.

In certain types of furnace systems, it is desirable that any controller recognize certain other furnace system parameters as a function of the overall control strategy. Accordingly and in another type of furnace, a forced air combustion fan (not shown) may be energized upon closure of the thermostat contacts 51 and prior to any attempts to ignite the combustible fuel. The actuation of a fan of this type may be detected by using an airflow or "sail switch" (not shown); that is, a pivotably mounted vane disposed in the air duct reposing laterally thereto in the absence of a flow of air and pivoting parallel to the duct upon the commencement of air movement. The vane is equipped with an electrical switch 67 which may, for example, be normally open in the absence of air movement and maintained closed in the presence of moving air. This switch 67 may be coupled to a source of AC power such as the load terminal 59 of the thermostat power line 55. The microprocessor 15 may be programmed to detect the initial position or state of the vane-attached switch 67 as well as the length of time required for such switch 67 to change state, signaling a fully pivoted vane. If in the example the switch 67 is in other than a normally-open position upon closure of the thermostat contact 51 or if vane pivoting and consequent closure of the switch 67 requires a time greater than that programmed in the microprocessor 15, the latter will disable the entire controller 10. Such disablement may be desirable since the inordinate time lapse may be indicative of a defective vane or associated switch 67. An air pressure switch may be used in lieu of the vane and switch 67.

Yet other types of furnaces require that the boiler water temperature be below a predetermined maximum before a gas ignition sequence can be initiated or require that more or fewer furnace burners be ignited, depending upon water temperature. To that end, an aquastat switch 69 may be coupled to yet another input stage 11e for generating an input logic signal which represents whether the water temperature is above or below the aquastat setting. Since each of the input stages 11 is configured identically, it is apparent that when an input stage 11 is driven by a 24 VAC signal taken from the controller power supply 23 or from the load terminal 59, the input signal which is directed to a microprocessor port will be repetitively transitional between a first logic stage, logic "1" for example, and a second logic state, logic "0" for example. When constructed and arranged in the manner shown and described, the repetitive transitional signal of any input stage 11 will be coincident both in time and logic state with the repetitively transitional clocking signal. It will be equally apparent that the synchronizing stage 11b may employ an AC input voltage which is different in frequency from the AC input voltage used in any of the other input stages 11. For example, the AC input voltage to the synchronizing stage 11b may be some integer multiplier of the frequency of the AC input voltage applied to other stages 11, a multiplier of 3, for instance. In that event, the microprocessor 15 may be programmed to permit the actuation of an output stage 13 only on every third cycle of the synchronizing stage input voltage. While such microprocessor programming may be easily accomplished to recognize these frequency differences, such a scheme would add needless complexity to the controller 10 and the earlier described approach is preferred. The operation of input stages 11c and 11d will be explained below in connection with the detailed description of the output stages 13. Since the output stages 13 are configured identically one to the other in a preferred embodiment, the details of only the leftmost illustrated stage 13a will be set forth.

As seen in FIGS. 2B and 2C, the output stage 13a includes a capacitor 71, a source 73 of alternating voltage, a means 75a, 75b for rectifying this alternating voltage and transistor means 77 switchable between a non-conducting state and a conducting state for charging and discharging the capacitor 71. Capacitor discharging is along an electrical path which includes the transistor 77 and the operating coil 79 of an electromagnetic relay, the electrical contact 81 of which may be coupled to one or more load devices for actuation thereof.

More particularly, the transistor 77 is preferably of the field effect type having the base thereof coupled by a fault current limiting resistor 83 to the microprocessor 15 for controllably biasing the transistor 77 to a conducting or nonconducting state. With a first source of alternating voltage coupled to the output stage 13a between the input terminal 61 and the ground bus 85, the transistor 77 is held in a non-conducting state during positive half cycles of the first alternating voltage source. The capacitor 71 is thereby permitted to charge along a path which includes the diodes 75a and 75b. During negative half cycles of the first voltage, the transistor 77 is biased to a conducting state whereby the capacitor 71 is permitted to discharge along an electrical path which includes the transistor 77 and the electromagnetic coil 79. It is preferred for ease of microprocessor programming that the microprocessor signal used to controllably bias the transistor 77 and the alternating voltage applied to terminal 61 of the output stage 13a be synchronous. This is so since the biasing of the transistor 77 to a conducting state at times other than during negative half cycles of the first voltage will cause a relatively high current to flow through the diode 75a, the resistor 87 and the transistor 77, causing a voltage drop across the resistor 87 effectively preventing the capacitor 71 from charging. The fuse 57 may also rupture and in either event, the load device coupled to the output stage 13a will be deactivated. Similarly and in the event of a shorting failure of the transistor 77 between its source and drain or in the event of a shorting failure of the diode 75b, the capacitor 71 will be effectively prevented from recharging and the load device coupled to that output stage 13a will be deactivated.

In the illustrated embodiment, the four output stages 13a–d are adapted to be coupled to a first main valve, a second main valve, a pilot valve and a fan, respectively. It is to be appreciated that this embodiment represents one of the more complex arrangements in which the controller 10 may be configured. In a simpler configuration, only one output stage 13a would be required to operate a single main valve in a pilotless system. It should also be appreciated that if the load devices such as the valves have a sufficiently low power requirement, they may be activated directly by an output stage 13 and the electromagnetic relay may be omitted.

In certain types of furnaces, it is desirable to permit the microprocessor 15 to verify the actuation of certain output stages. Accordingly and referring to output stages 13a and 13b, closure of the electromagnetic relay contact 81 will cause a feedback signal to be directed along the lines 89 and 91 to those respective input stages 11d and 11c which are dedicated to the generation of a verifying logic signal. For example, upon receipt of a feedback signal at the voltage divider of the verifying input stage 11d a verifying signal will be directed to the microprocessor 15 at its input terminal 93. This input signal will be repetitively transitional between a logic "1" state and a logic "0" state for detection by the microprocessor 15 and with appropriate programming, the failure of the microprocessor 15 to receive a verifying signal will cause the controller 10 to disable all output stages 13.

Unless spark generation and flame sensing is provided by other means, the microprocessor 15 preferably includes an output port 95 for controlling the actuation of a spark generating circuit 17. When gated by the microprocessor 15, the silicon controlled rectifier (SCR) 97 permits an alternating current to flow through the primary of the transformer 99, thereby causing a fuel-igniting spark to appear across a gap connected in series with the transformer secondary. Upon fuel ignition within a predetermined, programmable time, a flame sensing probe unit 19 directs a signal to the microprocessor 15 by permitting a net charge to be formed on capacitor 101 because of the diode effect of now-gated field effect transistor 103. In most furnace systems, it is preferred that a loss of the fuel-consuming flame be immediately recognized in order that the main fuel valve(s) may be immediately disabled. Unless other steps are taken, the flame signal represented by the level of charge on the capacitor 101 would diminish only over a relatively long period of time as that charge is depleted. Accordingly, a rapid depletion resistor 105 is coupled intermediate the capacitor 101 and a control port 107 of the microprocessor 15. The microprocessor 15 is programmable to internally short circuit the port 107 to ground once for each predetermined number of cycles of the AC power line. In a preferred embodiment, this shorting occurs once each five or six cycles. When constructed and arranged in that manner and when used on a 60 Hz line, the controller 10 will detect the loss of a flame in approximately 0.1 seconds.

One type of furnace system with which the controller 10 of the present invention will be particularly useful is a system of the pulse burner type. Because of the aforedescribed difficulty of ignition, a preferred method of controlling such a furnace would include the steps of (a) sensing the initial state of an air flow vane switch 67, (b) energizing a blower for effecting a prepurge of any combustible mixture, (c) sensing a change of state of the air flow switch 67 within a predetermined time-lapse, (d) energizing the output stage 13 coupled to a pilot valve, (e) energizing a spark generating circuit 17, (f) sensing whether or not a pilot flame is established within a predetermined time-lapse and, if so, (g) energizing a main fuel valve. A variant of this method may include energizing one or two main fuel valves depending upon whether the furnace water temperature is above or below a predetermined set point as determined by an aquastat. Yet another variant of this method would include a trial energization of the sparking circuit immediately preceding the energization of the pilot valve output stage 13.

Because pulse burner furnaces sometimes fail to ignite on the first trial, the microprocessor 15 may also be programmed to attempt a plurality of trials, five for example, each trial including steps (a) through (f) above. Absent ignition upon one of the trials, the controller 10 will revert to a disabled or lockout status.

For ease in troubleshooting, it may be desirable to incorporate a plurality of optional color coded LED's 21. In the illustrated embodiment, a red LED 21a is identified as a failure lamp, a first yellow LED 21b is identified as a purge lamp and a second yellow LED 21c is identified as a trial lamp. The trial and purge lamps 21c, 21b are illuminated when those respective functions are occurring and if fuel ignition occurs, the microprocessor 15 may be programmed to illuminate both the purge and trial lamps 21b, 21c. In the event the microprocessor 15 detects a failure or error in either the hardware or programming, it will cause all lamps 21a–21c to be illuminated, the coincident illumination of which is indicative that a failure has occurred and that such failure is somewhere in the controller 10 rather than within an external device.

The following components have been found useful in the illustrated embodiment. Resistances are in ohms, 5% tolerance, capacitances are in microfarads, 10% tolerance, both unless otherwise specified.

| FIGS. 2A, 2B, 2C | |
| --- | --- |
| R1–R19, R25 10K | R20–R22 220 |
| R23 12K | R24,R28,R31,R34,R37,R40,R48 1K |
| R26 820 | R27 270 |
| R29,R32,R35,R38 200K | R41,R43 1 M |
| R42 1.5 M | R44,R45 2.2 M |
| R46 470 | R47 3.3K |
| R50–R54 100 | R61–R64 4.7 |
| D1–D12 1N4148 | D13–D27 1N5060 |
| C1–C8,C21 0.047 | C9 330 |
| C10,C11 0.1 | C12,C14,C16,C18,C20 22 |
| C13,C15,C17,C19 47, 50 V | C22 1.5 |
| C23,C24 0.12 | C25 0.022 |
| C26, C27 1,200 V. | U1 LM317T |
| Q1–Q4 2N5307 | U2 MC6804 |
| Q5 MPF3821 | Q6 C106 |
| F1 1A | |

While only a few embodiments have been shown and described herein, the invention is not intended to be limited thereby but only by the scope of the claims which follow.

We claim:

1. A method for controlling a combustible fuel burner including the steps of:
   directing a system clocking signal to a microprocessor; said clocking signal being repetitively transitional between a first logic state and a second logic state;
   providing an output stage including transistor means switchable for controllably actuating a load device;
   directing an input signal to said microprocessor, said input signal being repetitively transitional between a first logic state and a second logic state;
   comparing said logic states of said clocking signal and said input signal, and;
   disabling said load device if the first or second logic states of said input signal are noncoincident in time with said first and second logic states, respectively, of said clocking signal.

* * * * *

UNITED STATES PATENT AND TRADEMARK OFFICE
CERTIFICATE OF CORRECTION

PATENT NO. : 4,581,697
DATED : April 8, 1986
INVENTOR(S) : J. Scott Jamieson, Henry A. Gleason It is certified that error appears in the above-identified patent and that said Letters Patent are hereby corrected as shown below:

Column 1, Line 45, "combustion" should be --combustible--

Column 3, Line 14, "stages" should be --stage--

Column 3, Line 66, "The" should be --To--

Column 5, Line 17 "stage" should be --state--

Column 5, Line 25, "in" should be --on--

Signed and Sealed this

Fifth Day of August 1986

[SEAL]

Attest:

DONALD J. QUIGG

Attesting Officer

Commissioner of Patents and Trademarks